United States Patent Office 2,982,754
Patented May 2, 1961

2,982,754

POLYISOCYANATE - MODIFIED POLYESTER OF TEREPHTHALIC OR ISOPHTHALIC ACID, AND ELECTRICAL CONDUCTOR COATED THEREWITH

Howard E. Sheffer, Burnt Hills, and John F. Meyer, Schenectady, N.Y., assignors to Schenectady Varnish Company, Inc., Schenectady, N.Y., a corporation of New York No Drawing. Filed Nov. 8, 1957, Ser. No. 695,191

21 Claims. (Cl. 260—33.4)

The present invention relates to improved polyhydric alcohol esters of terephthalic and isophthalic acids suitable for use in making wire enamels and to electrical conductors coated with such esters.

It is an object of the present invention to provide improved polymeric esters of terephthalic acid and isophthalic acid with a glycol and a polyhydric alcohol having at least three hydroxyl groups.

An additional object is to prepare wire enamel compositions of this type which permit increased operating temperatures for the electrical conductors, appliances and other electrical apparatus to which the enamel is applied.

A further object is to prepare polymeric esters of terephthalic acid and isophthalic acid which have improved bonding properties to electrical conductors, appliances and other electrical apparatus.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that the foregoing objects can be attained by modifying a polymeric ester of terephthalic or isophthalic acid as hereinafter identified with a polyisocyanate, preferably a polyisocyanate having at least three isocyanate groups. Among the polyisocyanates which can be employed, there may be mentioned diisocyanates such as 2,4-tolylene diisocyanate, 2,6-tolylene diisocyanate, mixtures of 2,4- and 2,6-tolylene diisocyanates, cyclopentylene diisocyanate, m-phenylene diisocyanate, p-phenylene diisocyanate, ethylene diisocyanate, butylidene diisocyanate, 1,5-naphthalene diisocyanate, 1,6-hexamethylene diisocyanate, dianisidine diisocyanate, 4,4'-diphenyl ether diisocyanate, 4,4',4''-triphenyl methane triisocyanate (Desmodur R), the cyclic trimer of 2,4-tolylene diisocyanate, the cyclic trimer of 2,6-tolylene diisocyanate, mixtures of the cyclic trimers of 2,4-tolylene diisocyanate and 2,6-tolylene diisocyanate, the trimer of 4,4'-diphenyl methane diisocyanate, trifunctional isocyanate trimers having the formula:

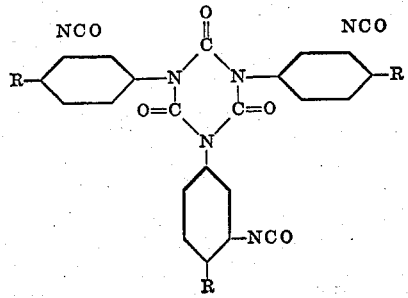

where R is a lower alkyl radical, e.g., n-butyl, tertiary butyl, secondary butyl, isopropyl, methyl, ethyl, etc., 1,3,5-triisocyanato benzene, 2,4,6-triisocyanato toluene, 4,4' - dimethyl-diphenylmethane, 2,2',5,5'-tetraisocyanate, 2,4,4'-triisocyanato diphenylmethane, 2,4,6-triisocyanato diphenyl ether, 2,2',4-triisocyanato diphenyl ether, 2,2',4-triisocyanato diphenyl sulfide, 2,4,4'-triisocyanato diphenyl sulfide, 2,3',4-triisocyanato-4'-methyl diphenyl ether, 2,3',4-triisocyanato-4'-methoxydiphenyl ether, 2,4,4'-triisocyanato-3'-chloro-diphenyl ether, 2,4,4'-triisocyanato-3',5'-dichloro-diphenyl ether, 2,3',4-triisocyanato-4',5-dimethyl diphenyl ether, 4,4',6-diphenyl triisocyanate, 1,2,4-butanetriol triisocyanate, 1,3,3-pentane triisocyanate, 1,2,2-butane triisocyanate, phloroglucinol triisocyanate, the reaction product of 3 mols of 2,4-tolylene diisocyanate with 1 mol of trimethylol propane, the reaction product of 3 mols of 2,6-tolylene diisocyanate with 1 mol of trimethylol propane, the reaction product of 3 mols of 2,4-tolylene diisocyanate with 1 mol of trimethylol ethane and in general the reaction product of a diisocyanate with sufficient polyhydric alcohol to react with half the isocyanate groups.

While the polyisocyanates can be used as such, particularly where pot life is not important, it is preferred to block the isocyanate groupings with a group that will split off at the reaction temperature employed with the polymeric terephthalic or isophthalic ester. Typical compounds which can be used to block the isocyanate groupings, e.g., by forming carbamates therewith, are monohydric phenols, such as phenol, meta-cresol, para-cresol, ortho-cresol and mixtures thereof, the xylenols, e.g., 2,6-dimethyl phenol, 4-ethyl phenol, 4-tertiary butyl phenol, 2-butyl phenol, 4-n-octyl phenol, 4-isooctyl phenol, 2-chloro phenol, 2,6-dichloro phenol, 2-nitrophenol, 4-nitro phenol, 3-nitro phenol, monohydric alcohols such as methyl alcohol, ethyl alcohol, n-propyl alcohol, isopropyl alcohol, tertiary butyl alcohol, tertiary amyl alcohol, octyl alcohol, stearyl alcohol, aceto-acetic ester, hydroxyalkylcarbamic acid aryl esters, e.g., hydroxyethylcarbamic acid phenyl ester, hydroxyethylcarbamic acid cresyl ester; diethyl malonate, mercaptans, e.g., 2-mercaptobenzothiazole, 2-mercaptothiazoline, dodecyl mercaptan, ethyl 2-mercaptothiazole, p-naphthyl marcaptan, α-naphthyl mercaptan, methyl mercaptan, butyl mercaptan, lactams, e.g., ε-caprolactam, Δ-valero-lactam, γ-butyrolactam, β-propiolactam, imides, e.g., succinimide, phthalimide, naphthalimide, glutarimide; dimethylphenyl carbinol, secondary amines, e.g., o-ditolylamine, m-ditolylamine, p-ditolylamine, N-phenyl toluidine, phenyl-α-naphthylamine, carbazole, diphenylamine, etc.; mono-α-phenylethyl phenol, di-α-phenylethyl phenol, tri-α-phenylethyl phenol, carvacrol, thymol, methyl diphenyl carbinol, triphenyl carbinol, 1-nitro tertiary butyl carbinol, 1-chloro-tertiary butyl carbinol, triphenyl silinol, 2,2'-dinitrodiphenylamine, 2,2'-dichloro-diphenylamine, ethyl n-butyl malonate, ethyl benzyl malonate, acetyl acetone, acetonyl acetone, benzimidazole, 1-phenyl-3-methyl-5-pyrazolone.

As specific examples of such blocked polyisocyanates, there may be mentioned Mondur S, wherein the isocyanate groups of the reaction product of 3 mols of mixed 2,4- and 2,6-tolylene diisocyanate with trimethylol propane are blocked by esterification with phenol and Mondur SH, wherein the mixed cyclic trimers of 2,4- and 2,6-tolylene diisocyanates have the three free isocyanate groups blocked by esterification with m-cresol. At present Mondur SH is the preferred polyisocyanate.

Other blocked polyisocyanates include the cyclic trimer of 2,4-tolylene diisocyanate having the isocyanate groups blocked with tertiary butyl alcohol or tertiary amyl alcohol or dimethyl ethinyl carbinol or acetoacetic acid ester or phenol or cresylic acid or ε-caprolactam or 2-mercaptobenzothiazole or succinimide or phthalimide or diphenyl amine or phenyl-β-naphthyl amine, triphenyl methane triisocyanate having the isocyanate groups blocked with phenol or mixed cresols or tertiary butyl alcohol or phthalimide, 1,3,3-pentanetriisocyanate having the isocyanate groups blocked with m-cresol, etc.

Unless otherwise stated, hereinafter in the specification and claims, it is understood that whenever the term "polyisocyanate" is employed, it is intended to include both the free isocyanates and the blocked isocyanates.

The polyisocyanates are mixed with the terephthalate or isophthalate esters in order to prepare the final compositions of the instant invention. The terephthalate or isophthalate is prepared by reacting a polyhydric alcohol having at least 3 hydroxyl groups, such as glycerine, pentaerythritol, 1,1,1-trimethylolethane, 1,1,1-trimethylolpropane, sorbitol, mannitol, dipentaerythritol, hexanetriol, diglycerol, etc., or mixtures of these alcohols together with an α,ω aliphatic hydrocarbon diol having 4 to 5 carbon atoms, e.g., butanediol 1,4; pentanediol 1,5; butene-2-diol 1,4 and butyne-2-diol 1,4 with terephthalic acid or isophthalic acid or acyl halides thereof, e.g., terephthalic acid dichloride, or a lower dialkyl ester thereof, e.g., methyl, ethyl, propyl, butyl, amyl, hexyl and octyl terephthalates and the corresponding isophthalates as well as the half esters, e.g., monomethyl terephthalate, as well as mixtures of such esters and acids or acid halides. A portion of the 4 to 5 carbon atoms aliphatic hydrocarbon diol can be replaced by ethylene glycol so that of the total alkanediol present 20 to 100 weight percent of the glycol is the 4 to 5 carbon atom aliphatic hydrocarbon diol and the balance is ethylene glycol; when using a mixture of alkanediols usually 10 to 80% is ethylene glycol.

The preferred polyhydric alcohols having at least 3 carbon atoms are glycerine and trimethylol propane. The preferred phthalic compound is dimethyl terephthalate and, in general, the terephthalates are preferred to the isophthalates. The preferred alkane diol is 1,4-butanediol.

The transesterification reaction and polymer formation between the dialkyl terephthalate, polyhydric alcohol having at least three hydroxy groups and aliphatic hydrocarbon diol can be carried out in the absence of a solvent, but preferably cresol or cresylic acid is present as a solvent. While it is not essential to use an esterification catalyst, it is frequently desirable to do so. Conventional catalysts such as hydrochloric acid, toluene sulfonic acid, litharge, lead acetate, zinc oxide, ferric acetate, etc. can be used. The preferred catalyst is litharge.

For each 776 parts (4 mols) of dimethyl terephthalate there are employed sufficient alcohol, i.e., aliphatic hydrocarbon diol and polyhydric alcohol having at least three hydroxyl groups, to provide at least about one hydroxyl group for each carboxyl (COO) group. Preferably, there are present a total of 1.0 to 1.6 hydroxyl groups on the alcohols for each carboxyl group on the terephthalic acid or derivative thereof.

Generally, from 25 to 75% of the total alcohol by weight has at least three hydroxyl groups and the balance 75 to 25% by weight is aliphatic hydrocarbon diol. As previously mentioned, 20 to 100% of the diol by weight is butanediol-1,4; pentanediol 1,5; butene-2-diol 1,4 or butyne-2-diol 1,4 (or a mixture of these materials) and the balance is ethylene glycol.

Another way of expressing the percentages of the various materials used as reactants is in equivalent percent. Generally, there is 25 to 62 equivalent percent of the terephthalic acid derivative, e.g., dimethyl terephthalate; 13 to 46 equivalent percent of the aliphatic hydrocarbon diol, i.e., butanediol 1,4, and 13 to 46 equivalent percent of the aliphatic polyhydric alcohol having at least three hydroxyl groups, e.g., glycerine; of the aliphatic hydrocarbon diol 20 to 100% by weight is α,ω aliphatic hydrocarbon diol having 4 to 5 carbon atoms and the balance, i.e., 80 to 0% by weight is ethylene glycol. The term "equivalent percent" has been defined in the literature divided by the total number of equivalents of all reactants times 100.

Pentaerythritol can be used in pure form or as a commercial mixture such as a mixture of 90% pentaerythritol and 10% dipentaerythritol, commercially available as Pentek. The pentaerythritol can be used to replace the glycerine in whole or in part. Account should be taken in such replacement of the additional hydroxyl group available on pentaerythritol.

On a weight basis, it has been found desirable to utilize for every 776 parts of dimethyl terephthalate (or the equivalent weight of other terephthalic acid material) 75 to 250 parts of the alkane diol and 75 to 250 parts of the polyhydric alcohol containing at least 3 hydroxyl groups. The polyisocyanate is normally employed in an amount of 1 to 40 parts, and preferably 15 to 25 parts, based on a total of 100 parts of polyisocyanate and polyester of terephthalic acid or isophthalic acid.

The compositions of the present invention have many uses. Thus, they can be employed to coat electrical conductors such as copper wire and to coat various electrical apparatus. While the present resins are primarily used in electrical applications, they can also be used in paint and varnish formulations and for molding materials such as cups, for example.

For electrical applications, the polyisocyanate and polymeric ester of terephthalic or isophthalic acid is normally employed in a solvent. The solvent usually contains cresylic acid.

Generally, the cresylic acid has a boiling range of 200° to 220° C., e.g., about 205° C. Cresylic acid is defined in Bennett's concise Chemical and Technical Dictionary (1947), as a mixture of o-, m-, and p-cresols having a boiling range of 185° to 230° C.

In place of cresylic acid, the individual cresols, e.g., para cresol, meta cresol or ortho cresol can be employed, but it is preferred to use the commercial cresylic acid mixture.

It is frequently desirable to dilute the cresylic acid with a heavy coal tar or petroleum naphtha or with xylene, etc. The naphtha can be employed in an amount of from 0 to 60%, e.g., 5 to 60%, based on the total weight of the solvent mixture. Cresylic acid is the better solvent insofar as solvent power is concerned, but the naphtha improves the smoothness of the coated wire. Preferably, the naphtha is added after the polyester has reached the desired stage of reaction, as indicated by viscosity determinations. However, the naphtha can be added earlier if desired. Various conventional naphthas, especially high boiling naphthas, can be employed, such as EW naphtha (an enamel wire heavy coal tar naphtha sold by the Barrett Division of Allied Chemical and Dye Corporation) and Solvesso No. 100, an aromatic naphtha derived from petroleum.

The polyester is normally prepared in the presence of the cresylic solvent at a temperature between 80° C. and the reflux temperature of the solvent.

Usually, the reaction is continued until the product has a viscosity in cresylic acid of 4000 to 5000 centipoises, measured at 25° C. (room temperature) and at 35 to 45% solids concentration. Preferably, the reaction is carried out until the polyester has a Gardner-Holt viscosity of about $Z_3$ at 40% solids concentration in cresylic acid at room temperature.

The polyisocyanate and the polymeric terephthalate can be mixed dry, if desired. Generally, however, either one or both are dissolved in a solvent prior to mixing. Thus, the polyisocyanate can be added to the polymeric terephthalate dissolved in cresylic acid with or without xylene, naphtha or other hydrocarbon diluent at a temperature between room temperature and 240° F. Alternatively, the polyisocyanate dissolved in a cresylic acid solvent with or without a hydrocarbon diluent can be mixed with the polymeric terephthalate similarly dissolved in cresylic acid with or without a diluent at room temperature or at an elevated temperature up to about 240° F. When employing blocked polyisocyanate, it is desirable that the mixing be done at a temperature which is not sufficiently high to remove the blocking groups prematurely, and it is for this reason that temperatures below 240° F. are normally preferred.

The reaction between the polymeric terephthalate and the polyisocyanate is hastened by the use of elevated temperatures, and in preparing wire enamels they are generally reacted at a temperature of about 650 to 800° F. However, other temperatures can be employed so long as the temperature is sufficiently elevated to remove the blocking group on the polyisocyanate by ester interchange with the free hydroxy groups of the polymeric terephthalate or isophthalate. The solvent mixture of the polymeric terephthalate and polyisocyanate can be applied to wire, e.g., copper wire, by either of two methods conventionally employed in the wire enamelling art. Thus, the solvent mixture with a solids content of 24 to 40% can be run by the die procedure. When the free dip procedure is employed, the solvent mixture is normally thinned with additional naphtha to reduce the viscosity and lower the solids content, e.g., the viscosity is reduced to about 50 to 100 centipoises or less. The wire coated in either of these processes is then baked in a wire enamelling oven at conventional temperatures above the boiling point of the solvent and sufficiently high to unblock the polymeric isocyanate and thereby complete the polymerization and inter-reaction of the polymeric terephthalate and polyisocyanate. Typical temperatures are 650 to 850° F. Wire speeds of 18 to 45 feet/minute can be employed.

In the following examples and throughout this specification and claims, all parts are parts by weight, unless otherwise specified.

It has been further found that the addition of small amounts of zinc, lead, calcium or cadmium compounds materially improves the abrasion properties of the enamel. There can be used the usual zinc, lead, calcium or cadmium driers, such as the linoleates, octoates and resinates of each of these metals, e.g., zinc resinate, cadmium resinate, lead linoleate and calcium linoleate. Likewise, there can be employed the naphthenates, specifically zinc naphthenate, lead naphthenate, calcium naphthenate, and cadmium naphthenate.

Other metal driers, specifically polyvalent metal driers, such as manganese naphthenate and cobalt naphthenate, can also be employed, although zinc octoate is preferred.

The metal compound is preferably used in an amount between 0.2% and 2.0% metal based on the total solids of the enamel.

The enamels of the present invention, both with and without the addition of the metal drier, have outstanding resistance to high temperatures, thus enabling them to be used as class B insulation, as well as class F insulation and, in fact, they approach class H in temperature resistant properties.

In the following examples, unless otherwise indicated, the polyester-polyisocyanate resin solution was applied to a No. 18 AWG wire by the die application procedure, using the indicated wire speeds and thereafter passing the coated wire through a 12 foot oven at a temperature of 750° F. Six passes of the wire through the solution and oven were employed and the total build-up of resin enamel on the wire in each case was about 2.7 to 3.0 mils. Various tests on wires coated with enamel compositions of the present invention were made. These tests are described in more detail in Belgian Patent No. 543,486.

The use of polyisocyanates with terephthalate polyesters has the advantage over the terephthalate polyesters alone of increasing the operating temperature of apparatus made from the enamelled wire, e.g., an increase of 10 to 20° C. in operating temperature can be employed. In addition, the use of the polyisocyanate makes it easier to apply the terephthalate polyester, gives a smoother wire and can be applied at 15% faster speeds than the terephthalate polyester alone. Furthermore, improved heat shock, cut through temperature and particularly dielectric twist aging is obtained. The use of small amounts of the polyisocyanate, e.g., 1–7% of the total of isocyanate and polyester, increases the smoothness of the polyester coated wire, while, at the same time, retains outstanding flexibility properties. The use of relatively high amounts of polyisocyanate, e.g., 20–40% of the total of isocyanate and polyester, imparts improved heat resistance, but has some loss in flexibility in contrast to the smaller amounts of isocyanate.

The use of glycerine as the polyhydric alcohol having at least 3 hydroxyl groups has the advantage of improving the heat shock, while the use of trimethylolpropane has the advantage of making a smoother coating on the wire.

In Examples 1 to 9, the following procedure was used: The glycerine, dimethyl terephthalate, butanediol 1,4 (and ethylene glycol when employed), litharge (catalyst) and cresylic acid (solvent) were placed in a reactor fitted with an agitator, a thermometer and an air-cooled column connected to a distillation conductor.

The reactor was then heated to 177° C. and the agitator was started. The temperature was then gradually raised to a temperature between 232 and 243° C. over a period of 6 hours. The rate of temperature rise was maintained at about 11° C. per hour during this period. There was a steady distillation of methanol. The mixture in the reactor was then maintained at 232 to 243° C. until the Gardner-Holt viscosity was $Z_5$ measured at 40% solids in cresylic acid. Generally, it required 6 to 12 hours of coking at 232 to 243° C. to reach this viscosity. When each batch reached a viscosity of $Z_5$ at 40% solids, it was then diluted with a thinner (cresylic acid or a mixture of cresylic acid and xylol) and a solution of 60 parts of 9% zinc octoate in E.W. naphtha added and then Mondur SH, and the mixture applied to No. 18 AWG wire by the die application procedure in the manner previously set forth.

*Example 1*

| | Parts |
|---|---|
| Dimethyl terephthalate | 776 |
| Ethylene glycol | 140 |
| Glycerine | 120 |
| Butanediol 1,4 | 51 |
| Cresylic acid | 200 |
| Litharge | 0.2 |

When a viscosity of $Z_5$ measured at 40% solids in cresylic acid was reached by the reaction procedure just set forth, the reaction mixture was diluted with cresylic acid. To the thus diluted mixture was added 60 parts of the 9% zinc octoate in E.W. naphtha and 688 parts of a 30% solution of Mondur SH dissolved in crysylic acid. The resulting composition had a viscosity of $Z_3$—$Z_4$ and a solids content of 45%. The Mondur SH was 20% of the total resin solids and the polyester was 80% of the resin solids. The composition was applied to No. 18 AWG wire by the die application procedure using 6 passes and an oven temperature of 750° F. to provide a build-up of approximately 3 mils. When run at 25 feet/minute in the abrasion resistance test (scrape test) the sample withstood 46 strokes, passed the 25% elongation plus 3X flexibility test, the 70–30 solvent resistance test, the 50–50 solvent resistance test, the dielectric strength test; in the elongation after heating aging test using the more severe conditions of 3X mandrel at 175° C. the sample withstood for over 500 hours, passed the heat shock test, had a cut through temperature of 270° C. and in the high temperature dielectric strength test at 225° C. and 2000 volts did not fail for 250 hours. In another die application run but at 30 feet/minute, the abrasion test was 36 strokes, the 3 X mandrel at 175° C. was 720 hours, the cut through was 280° C. and the hours to failure at 2000 volts and 225° C. was 652 hours.

Example 2

Example 1 was repeated but using as the starting materials for forming the polyester:

| | Parts |
|---|---|
| Dimethyl terephthalate | 776 |
| Glycerine | 120 |
| Butanediol 1,4 | 250 |
| Cresylic acid | 200 |
| Litharge | 0.2 |

The zinc octoate in naphtha solution was added to give 0.75% of zinc octoate based on the polyester solids and the final composition had a viscosity of $Z_3$–$Z_4$, a solids concentration of 45% and of the resin solids 80% was polyester and 20% Mondur SH. The composition was applied to the wire at 25 feet/minute, and the coated wire in the dielectric strength test did not fail for 272 hours at 225° C.

Example 3

Example 2 was repeated. The only change was in the composition of the starting materials for forming the polyester.

| | Parts |
|---|---|
| Dimethyl terephthalate | 776 |
| Ethylene glycol | 44 |
| Glycerine | 150 |
| Butanediol 1,4 | 190 |
| Cresylic acid | 200 |
| Litharge | 0.2 |

The polyester-Mondur SH composition (80% polyester-20% Bondur SH on a solids basis) was applied to the wire at 30 feet/minute and the coated wire in the dielectric strength test did not fail for 176 hours at 225° C.

Example 4

Example 3 was repeated using as the composition for forming the polyester:

| | Parts |
|---|---|
| Dimethyl terephthalate | 776 |
| Glycerine | 150 |
| Butanediol 1,4 | 190 |
| Cresylic acid | 200 |
| Litharge | 0.2 |

The polyester (80%) and Mondur SH (20%) on a solids basis was applied to the wire at speeds of 25, 30 and 35 feet/minute. At 25 feet/minute, the results were 408 hours in the 3X mandrel test at 175° C., a cut through temperature of 270° C. and dielectric strength test 226 hours at 225° C.; at 30 feet/minute, the cut through temperature decreased to 265° C. and the dielectric strength test increased to 265 hours; at 35 feet/minute, the dielectric strength test increased to 403 hours at 225° C.

Example 5

Example 4 was repeated using as starting materials for the polyester:

| | Parts |
|---|---|
| Dimethyl terephthalate | 776 |
| Ethylene glycol | 100 |
| Glycerine | 225 |
| Butanediol 1,4 | 36.5 |
| Cresylic acid | 200 |
| Litharge | 0.2 |

The 80%–20% polyester-Mondur SH solution, when applied to the wire at 25 feet/minute, had a scrape test of 38 and a dielectric strength test of 578 hours; at 30 feet/minute, a scrape test of 39, a cut through of 302° C. and a dielectric strength test of 435 hours at 225° C., and at 35 feet/minute, a scrape test of 40, a cut through of 285° C. and a dielectric strength test of 536 hours at 225° C.

Example 6

Example 4 was repeated using as starting materials for the polyester:

| | Parts |
|---|---|
| Dimethyl terephthalate | 776 |
| Glycerine | 225 |
| Butanediol 1,4 | 182 |
| Cresylic acid | 200 |
| Litharge | 0.2 |

The 80% polyester and 20% Mondur SH in cresylic acid solution when applied to the wire at 25 feet/minute had a scrape of 41 and a cut through of 281° C. When applied at 30 feet/minute, the cut through dropped to 267° C.

In Examples 7, 8 and 9, there was employed the same polyester but the amount of Mondur SH was varied. The polyester in Examples 7–9 was prepared from the following composition:

| | Parts |
|---|---|
| Dimethyl terephthalate | 776 |
| Ethylene glycol | 114 |
| Glycerine | 150 |
| Butanediol 1,4 | 88 |
| Cresylic acid | 200 |
| Litharge | 0.2 |

To the composition, after formation of the polyester as described above, was added the zinc octoate solution in naphtha to give a total of 0.75% zinc octoate based on the polyester.

Example 7

To the polyester composition just described was added a 30% solution of Mondur SH in a solvent composed of 80% cresylic acid and 20% Solvesso 100 in an amount to give 10% Mondur SH and 90% polyester based on the total solids. Sufficient cresylic acid and Solvesso 100 were added to give a solids content of 31%. The solvents were employed so as to give a final solvent mixture of 80% cresylic acid-20% Solvesso 100. The viscosity was M. When the final composition was run on the wire at 25 feet/minute, the cut through was 291° C. and the dielectric twist aging was 338 hours at 220° C.; at a speed of 30 feet/minute, the cut through was 235° C. and the dielectric twist aging was 430 hours at 220° C.; and at 35 feet/minute, the cut through was 202° C.

Example 8

In this example the Mondur SH was added in an amount to give 22.5% Mondur SH and 77.5% polyester on the total solids. The percent solids of the final composition was 28% and solvent contained 80% cresylic acid and 20% Solvesso 100. The final viscosity was I–J. When the composition was run on the wire at 25 feet/minute, the scrape was 43, the cut through was 270° C. and the dielectric twist aging was 561 hours; at a speed of 30 feet/minute, the scrape was 30, the cut through 280° C. and the dielectric twist aging was 696+ hours at 220° C. (the test was stopped before failure).

Example 9

In this example, the Mondur SH was added in an amount to give 30% Mondur SH and 70% polyester. The percent solids of the final composition was 27% and the solvent consisted of 80% cresylic acid and 20% Solvesso 100. The viscosity of the final composition was H. When the composition was run on the wire at 25 feet/minute, the cut through was 293° C. and at 30 feet/minute, the cut through was 257° C.

To prepare a composition containing a small amount of polyisocyanate, Mondur SH was added to the polyester composition formed in Example 1 to give a total of 1% Mondur SH and 99% polyester resin on a total solids basis and the composition was diluted with cresylic acid to give 45% total solids. The use of 1% Mondur SH improved the smoothness of the coated wire without materially affecting the other properties.

We claim:

1. An electrical conductor provided with a continuous coating consisting essentially of the reaction product of (1) a polymeric ester of an acid selected from the group consisting of terephthalic acid and isophthalic acid with a mixture of polyhydric alcohols including (a) 25 to 75% by weight of a saturated aliphatic polyhydric alcohol having at least three hydroxyl groups and (b) 75 to 25% by weight of an $\alpha,\omega$ aliphatic hydrocarbon diol wherein from 20 to 100% by weight of said $\alpha,\omega$ diol has four to five carbon atoms and the balance of the $\alpha,\omega$ diol is ethylene glycol, said polymeric ester containing 25 to 62 equivalent percent of said acid, 13 to 46 equivalent percent of said alcohol having at least 3 hydroxyl groups and 13 to 46 equivalent percent of said hydrocarbon diol and (2) a polyisocyanate in an amount of 1 to 40% by weight of the total of the polyester and polyisocyanate.

2. An electrical conductor as in claim 1 wherein the isocyanate has at least three isocyanate groups.

3. An electrical conductor as in claim 2 wherein the ester is an ester of terephthalic acid.

4. An electrical conductor as in claim 3 wherein the polyhydric alcohol containing at least three hydroxyl groups is glycerine.

5. An electrical conductor as in claim 3 wherein the polyhydric alcohol containing at least three hydroxyl groups is trimethylolpropane.

6. An electrical conductor as in claim 3 wherein the diol having 4 to 5 carbon atoms is butanediol 1,4.

7. An electrical conductor as in claim 6 wherein the polyhydric alcohol having at least three hydroxyl groups is selected from the group consisting of glycerine, trimethylolethane, pentaerythritol and trimethylolpropane.

8. An electrical conductor as in claim 7 wherein the polyisocyanate is a blocked tolylene diisocyanate cyclic trimer, said blocking being done with a group that will separate off at the temperature of reaction with the polymeric ester.

9. A composition of matter consisting essentially of (1) a polymeric ester of an acid selected from the group consisting of terephthalic acid and isophthalic acid with a mixture of polyhydric alcohols including (a) 25 to 75% by weight of a saturated aliphatic polyhydric alcohol having at least three hydroxyl groups and (b) 75 to 25% by weight of an $\alpha,\omega$ aliphatic hydrocarbon diol wherein from 20 to 100% by weight of said $\alpha,\omega$ diol has 4 to 5 carbon atoms and the balance of the $\alpha,\omega$ diol is ethylene glycol, said polymeric ester containing 25 to 62 equivalent percent of said acid, 13 to 46 equivalent percent of said alcohol having at least 3 hydroxyl groups and 13 to 46 equivalent percent of said hydrocarbon diol and (2) a polyisocyanate in an amount of 1 to 40% by weight of the total of the polyester and polyisocyanate.

10. A composition according to claim 9 wherein the polyisocyanate has at least three isocyanate groups.

11. A composition according to claim 9 wherein the isocyanate groups are blocked, said blocking being done with a group that will separate off at the temperature of reaction with the polymeric ester.

12. A composition according to claim 11 wherein the polyisocyanate has at least three isocyanate groups.

13. The heat cross-linked reaction product of the composition of claim 9.

14. A composition according to claim 9 wherein the ester is an ester of terephthalic acid.

15. A composition according to claim 14 wherein the polyisocyanate is a blocked polyisocyanate, said blocking being done with a group that will separate off at the temperature of reaction with the polymeric ester.

16. A composition according to claim 15 wherein the polyhydric alcohol having at least three hydroxyl groups is selected from the group consisting of glycerine, trimethylolpropane, trimethylolethane and pentaerythritol.

17. A composition according to claim 16 wherein the diol having 4 to 5 carbon atoms is butanediol 1,4.

18. A composition according to claim 17 wherein the polyisocyanate is a blocked tolylene diisocyanate cyclic trimer, said blocking being done with a group that will separate off at the temperature of reaction with the polymeric ester.

19. A composition according to claim 9 including a cresol as a solvent.

20. A composition consisting essentially of (1) a polyester resin consisting essentially of the product of reaction of (a) 25 to 62 equivalent percent of a lower dialkyl ester of a member of the group consisting of terephthalic acid and isophthalic acid, (b) 13 to 46 equivalent percent of an $\alpha,\omega$ aliphatic hydrocarbon diol having 4 to 5 carbon atoms and mixtures of such a diol with up to 80% by weight of ethylene glycol and (c) 13 to 46 equivalent percent of an aliphatic polyhydric alcohol having at least three hydroxyl groups, the sum of equivalents of (a), (b) and (c) equaling 100 equivalent percent and (2) a polyisocyanate having at least three isocyanate groups in an amount of 1 to 40% by weight of the total of the polyester and polyisocyanate.

21. A composition according to claim 20 wherein the isocyanate is a blocked isocyanate, said blocking being done with a group that will separate off at the temperature of reaction with the polymer ester and the polyhydric alcohol having at least three hydroxyl groups is selected from the group consisting of glycerine, trimethylolpropane, trimethylolethane and pentaerythritol and the dialkyl ester is dimethyl terephthalate.

References Cited in the file of this patent

UNITED STATES PATENTS

| | | |
|---|---|---|
| 2,333,922 | Foster | Nov. 9, 1943 |
| 2,529,512 | Ott | Nov. 14, 1950 |
| 2,764,565 | Hoppe et al. | Sept. 25, 1956 |

FOREIGN PATENTS

| | | |
|---|---|---|
| 745,960 | Great Britain | Mar. 7, 1956 |